United States Patent [19]

Noonan et al.

[11] Patent Number: 5,669,451
[45] Date of Patent: Sep. 23, 1997

[54] ADJUSTABLE GUIDE RIG STRUCTURE FOR AN AGRICULTURAL IMPLEMENT

[75] Inventors: James Thomas Noonan, Johnston; Terry Lee Lowe, Ankeny; David Carl Winter, Johnston, all of Iowa

[73] Assignee: Deere & Company, Moline, Ill.

[21] Appl. No.: 569,325

[22] Filed: Dec. 6, 1995

[51] Int. Cl.$^6$ ..................................................... A01B 65/02
[52] U.S. Cl. ........................ 172/624.5; 172/497; 172/661
[58] Field of Search ............................. 172/497, 624.5, 172/661, 662

[56] References Cited

U.S. PATENT DOCUMENTS

| | | | |
|---|---|---|---|
| 905,895 | 12/1908 | Luchini | 172/661 X |
| 1,057,992 | 4/1913 | Andrew | 172/661 |
| 1,158,023 | 10/1915 | Beaver | 172/661 X |
| 3,452,826 | 7/1969 | Lehman | 172/624.5 X |
| 4,423,788 | 1/1984 | Robinson, Jr. et al. | 172/624.5 X |
| 4,493,375 | 1/1985 | Winter et al. | 172/1 |
| 4,509,603 | 4/1985 | Adams | 172/624.5 X |
| 4,553,607 | 11/1985 | Behn et al. | 172/624.5 X |
| 4,623,024 | 11/1986 | Schlenker | 172/624.5 X |
| 4,715,449 | 12/1987 | Winter et al. | 172/624.5 X |
| 4,846,084 | 7/1989 | Sigle | 172/624.5 X |
| 5,054,559 | 10/1991 | Paul | 172/624.5 X |

FOREIGN PATENT DOCUMENTS

| | | | |
|---|---|---|---|
| 755717 | 11/1933 | France | 172/624.5 |
| 2513574 | 10/1976 | Germany | 172/661 |

*Primary Examiner*—Randolph A. Reese
*Assistant Examiner*—Christopher J. Novosad

[57] ABSTRACT

A floating row crop cultivator rig is supported behind a rigid guide tire. A guide wheel standard straddles a bracket which mounts the forward end of a rig parallel bar linkage to a toolbar. A tool support depends from the aft end of the parallel bar linkage and carries a ground engaging element directly rearwardly of the guide tire. Instead of a conventional rig tire to control rig depth, an adjustable length member with a lost motion connection controls the lowermost position of the linkage and thus of the tool support while permitting upward movement of the linkage when an obstacle is encountered. A rod threaded through a trunnion on the tool support has a forward end supported in a slotted bracket on the lower bar of the parallel linkage to adjustably limit the lowermost position of the linkage while permitting the linkage to pivot upwardly against the bias of rig weight and an adjustable down pressure spring arrangement to clear obstacles. A spring trip standard may be supported by the tool support to additionally provide trip protection.

8 Claims, 2 Drawing Sheets

ADJUSTABLE GUIDE RIG STRUCTURE FOR AN AGRICULTURAL IMPLEMENT

BACKGROUND OF THE INVENTION

1) Field of the Invention

The present invention relates generally to tillage implements and, more specifically, to rig and guidance structure for an implement such as a row crop cultivator.

2) Related Art

Guidance structure for implements such as a row crop cultivator typically include ribbed guide tires that follow preformed grooves in the soil to keep earthworking tools properly aligned with the crop rows. A cultivator rig is fixed to the frame adjacent each of the ribbed tires and includes an earthworking tool supported behind the guide tire at a fixed height relative to the frame. The guide tire is connected directly to the implement frame and projects rearwardly a sufficient distance so that a conventional rig gage wheel cannot be used. Such fixed rigs make adjustment of the earthworking tool or element relative to the toolbar both time consuming and difficult. The rigs on most currently available guidance structures are unable to float or trip when buried obstacles are encountered and, as a result, damage to such structures is not uncommon.

BRIEF SUMMARY OF THE INVENTION

It is therefore an object of the present invention to provide improved rig and guidance structure for an implement. It is a further object to provide such an improved structure which overcomes most or all of the aforementioned problems.

It is a further object of the present invention to provide improved rig and guidance structure for an implement with a floating earthworking tool. It is a further object to provide such a structure which can be easily adjusted for different soil conditions and depth of operation.

It is still another object of the present invention to provide an improved rig and guidance structure having a floating, height adjustable guide rig that does not require a gage wheel.

A rig and guidance structure constructed in accordance with the teachings of the present invention includes a floating row crop cultivator rig, and a rigid ribbed guide tire supported from the toolbar by an upright standard. The standard straddles a bracket which supports the forward end of a rig parallel bar linkage. A tool support depends from the aft end of the parallel bar linkage and carries a ground engaging element directly rearwardly of the guide tire. However, instead of a conventional rig tire to control rig depth, an adjustable length member with a lost motion connection controls the lowermost position of the linkage and thus of the tool support while permitting upward movement of the linkage when an obstacle is encountered. A rod threaded through a trunnion on the tool support has a forward end connected to a bushing that is supported in a slotted bracket on the lower bar of the parallel linkage to adjustably limit the lowermost position of the linkage while permitting the linkage to pivot upwardly against the bias of the rig weight and an adjustable down pressure spring arrangement to clear obstacles. A spring trip standard may be supported by the tool support to additionally provide trip protection.

The adjustable length member provides simple height adjustment of the tool support without need for a rig gage wheel. The height adjustment and down pressure adjustments can be conveniently made from one general rearward location. The floating linkage and trip standard provide good protection when obstacles are encountered. The adjustable spring down pressure assures that the ground engaging element will penetrate the soil even in tough ground conditions. The structure is simple and inexpensive in construction and provides reliable operation of the soil engaging element at the desired depth. When the rig encounters a buried obstacle, the rig can move upwardly to clear the obstacle without damage to the structure. Once an obstacle is cleared, the rig automatically returns to the predefined maximum depth.

These and other objects, features and advantages of the present invention will become apparent to one skilled in the art upon reading the following detailed description in view of the drawings.

DETAILED DESCRIPTION OF THE DRAWINGS

Figure 1:
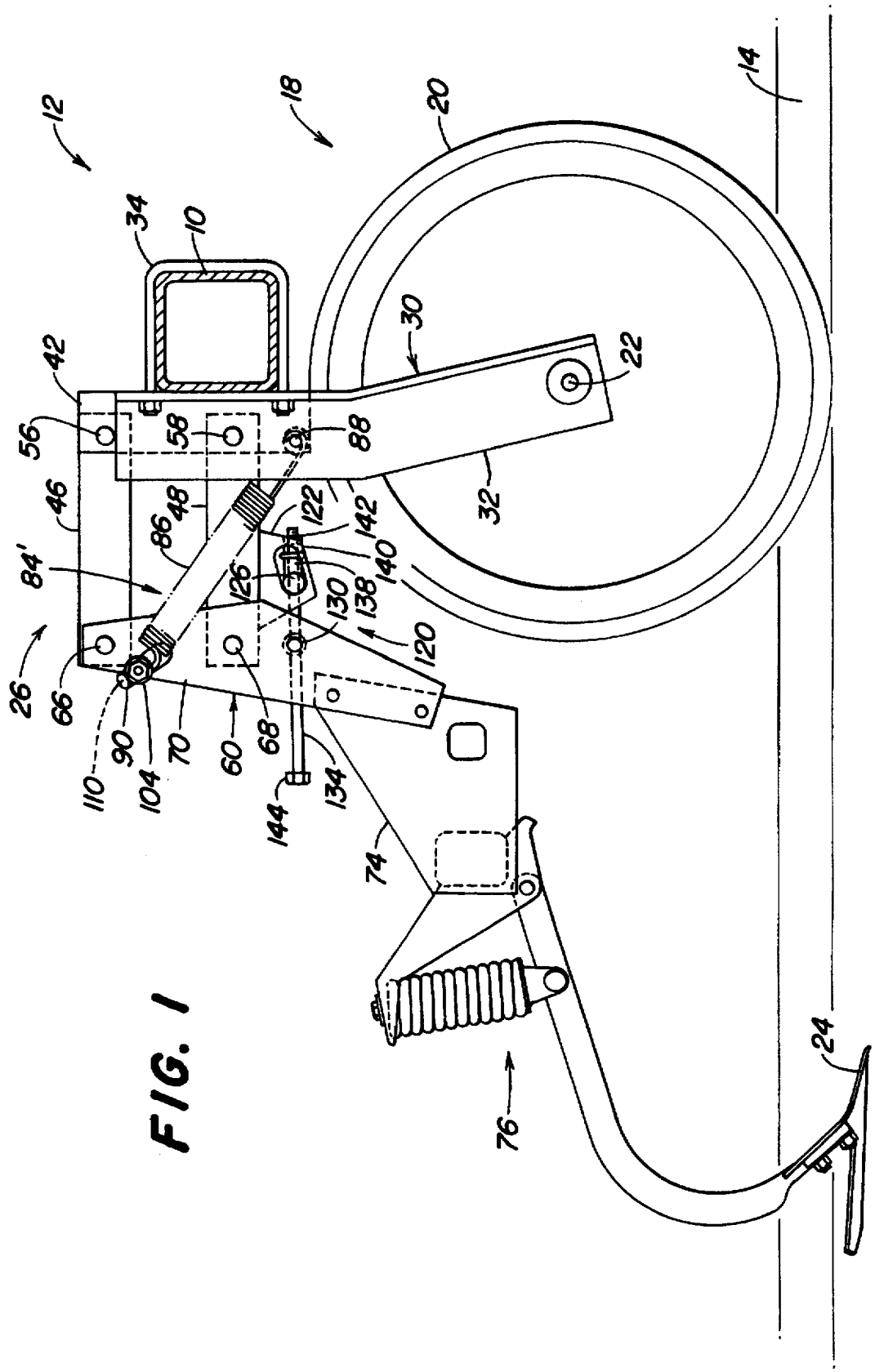
FIG. 1 is a side view of a cultivator rig and guidance structure.
Figure 2:
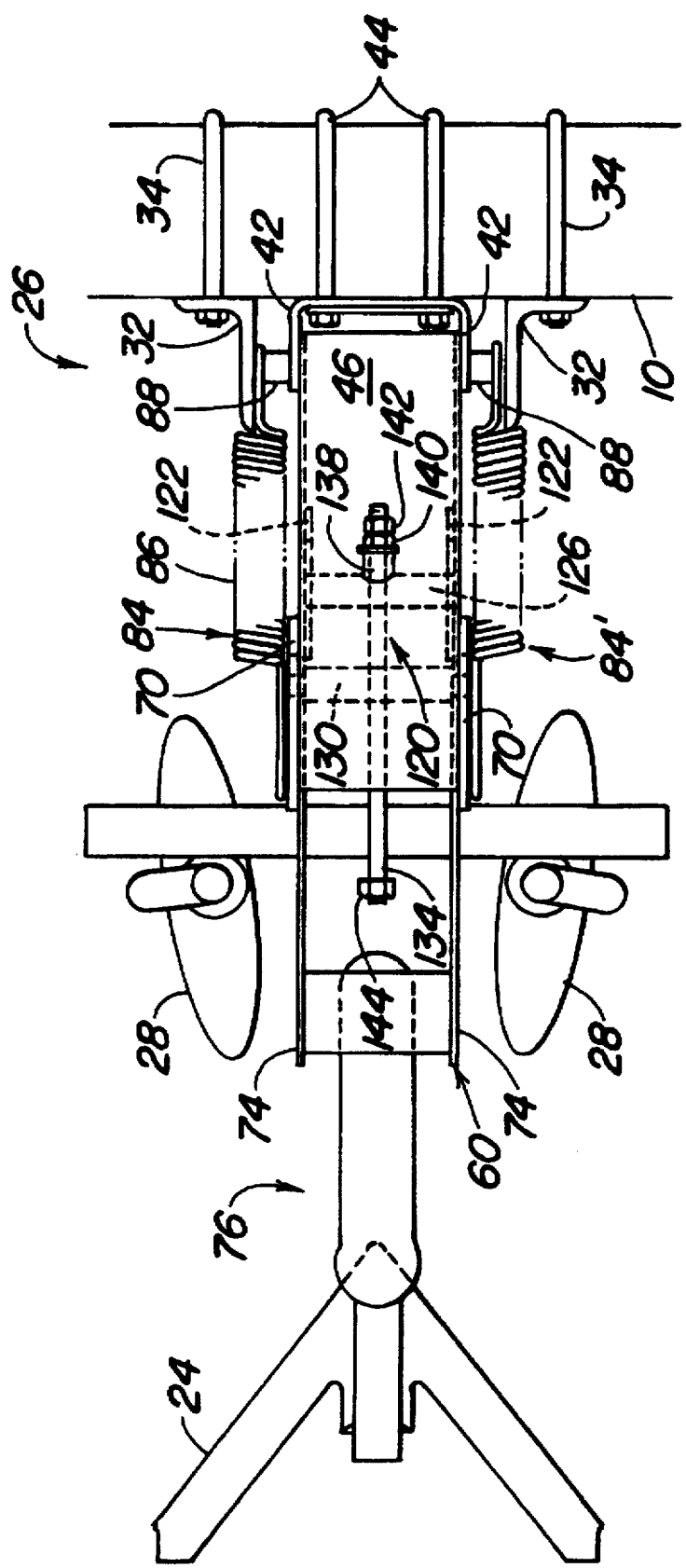
FIG. 2 is a top view of a portion of the rig and guidance structure of FIG. 1.

Referring now to FIG. 1, therein is shown a transversely extending main frame or toolbar 10 of an agricultural implement such as a row crop cultivator 12 or the like. The tool bar 10 is supported from the hitch (not shown) of a tractor for forward movement over the ground where crops are planted in parallel rows. A guidance furrow or groove 14 is provided in the soil by a previous tillage or planting operation. Guide wheel structure 18 is fixed to the toolbar 10 and includes a ribbed tire or guide wheel 20 which rotates about a transverse axis 22 and rides in the groove 14 to steer the tool bar 10 and maintain a desired lateral positioning of the implement 12 relative to the crop rows. A sweep or other ground engaging element 24 is supported behind the ribbed tire 20 by an adjustable floating linkage arrangement 26. The element 24 works the soil, and reforms the groove 14 if necessary for a subsequent operation. Additional ground engaging tools, such as barring off disks 28 (FIG. 2), may be supported from the floating linkage arrangement 26.

An upright standard 30 supports the guide wheel structure 18 with the wheel axis 22 located below the toolbar 10. The standard 30 includes a pair of transversely spaced flanged members 32 which are supported against the aft face of the toolbar 10 by U-bolts 34. The members 32 have upper ends which generally embrace the forward end of the floating linkage arrangement 26 (FIG. 2) and lower ends between which the guide wheel 20 rotates.

The linkage arrangement 26 includes forward angle brackets 42 connected by U-bolts 44 (FIG. 2) to the aft face of the toolbar 10 between the flanged members 32. Upper and lower parallel bars 46 and 48 have forward ends sandwiched between and pivotally connected at 56 and 58 to rearwardly directed flanges on the brackets 42. A rear tool support 60 is pivotally connected to the aft ends of the bars 46 and 48 at 66 and 68 (FIG. 1) and extends downwardly below the lower bar 48. The tool support 60 includes a pair of upright side plates 70 with upper portions embracing the aft ends of the bars 46 and 48 and lower portions embracing tool mounting structure 74 for attaching conventional tillage tools such as the sweep 24 and the barring off disks 28. As shown, a spring trip standard 76 is connected to the structure 74 and provides trip capabilities for the sweep 24 to complement the float provided by the linkage arrangement 26.

Down pressure structure 84 includes a spring 86 tensioned between the toolbar 10 and the linkage arrangement 26. As shown, the spring 86 includes a distal end connected to a spring support 88 projecting outwardly from the bottom of the upright bracket 42. The spring 86 also includes a proximate end connected to toggle structure 90. The toggle structure 90 is pivotally connected to the plate 70 for pivoting about an axis between an upper or high tension overcenter position (see 90 in FIG. 1) and a second or lower tension overcenter position. A wrench-receiving projection 104 or a handle member extends outwardly from the toggle structure 90 for moving the structure between the overcenter positions. A protrusion or stop member 110 projects inwardly from the inner side of the structure 90 at an aft location for contacting the aft edge of the plate 70 in the two overcenter positions. A second down pressure structure 84' with a generally identical spring and toggle arrangement (FIG. 2) can be provided on the opposite side of the linkage arrangement 26.

Adjustable stop means 120 is provided between the linkage arrangement 26 and the lower portion of the tool support 60 for adjustably limiting downward pivoting of the tool support 60 while permitting the arrangement to float upwardly against the downward bias of the weight of the rig and the bias of the down pressure structure 84 and 84' when an obstacle is encountered. A pair of slotted brackets 122 (FIG. 1) depend from the lower bar 48 forwardly of the pivot at 68. A bushing 126 extends between the slots in the brackets 122 and is free to slide generally in a fore-and-aft direction within the slots. A threaded bushing 130 is pivotally connected between the plates 70 below the pivots at 66 and 68. An elongated bolt 134 is threaded through the center of the pivot 130 and is slidably received through an aperture in the center of the bushing 126. A spacer 138 received over the threaded end of the bolt 134 abuts a flattened forward face of the bushing 126 and is secured between the bushing 126 and the end of the bolt 134 by a first nut 140 and a lock nut 142. Headed end 144 of the bolt 134 projects a substantial distance rearwardly from the aft edges of the plates 70, and the distance between the bushings 126 and 130 is adjustable to vary the lowermost field-working position (shown in FIG. 1) of the tool support 60 and the tool 24.

As the rig moves downwardly under the bias of the rig weight and the down pressure structure 84 and 84', the bushing 126 slides rearwardly in the slots of the brackets 122 until the bushing 126 bottoms against the aft end of the slots to stop further downward rocking of the tool support 60. The rig weight and the bias provided by the down pressure structure 84 maintain the bushing 126 in the bottomed out position within the slots so the tool 24 remains the desired preselected distance below the toolbar 10, the distance depending on the adjustment of the bolt 134. To increase the depth of operation of the tool 24, the operator simply rotates the bolt 134 in the direction that will increase the distance between the bushings 126 and 130. By turning the bolt in the opposite direction, the operator decreases the distance between the bushings and raises the lowermost position of the support 60 to decrease the depth of penetration of the tool 24. If an obstacle is encountered, the slots in the brackets 122 permit the rig to float upwardly. The standard 76 also provides a trip function to further protect the rig against damage when an obstacle is encountered. The down pressure can be changed to accommodate different soil condition by a simple rotation of the toggles 90. Down pressure and down stop position adjustments are arranged at one general rearward location for convenience and accessibility, and a single wrench can be used to make both adjustments.

Having described the preferred embodiment, it will become apparent that various modifications can be made without departing from the scope of the invention as defined in the accompanying claims.

We claim:

1. In a row crop implement adapted for forward movement through a field planted in parallel rows of crop, the implement having a tubular tool-supporting frame of rectangular cross section with front and rear faces, tools transversely spaced on the tubular frame and adapted to run between the rows of crop, rig and guidance structure for following a preexisting groove in the soil and maintaining the tools transversely positioned with respect to the rows, the rig and guidance structure comprising:

a guide wheel adapted to run in the groove;

a wheel support fixed to the frame, the wheel support including flanged members having transversely extending flanges positioned against an aft face of the frame and rearwardly directed transversely spaced flanges, the flanged members extending downwardly to a lower end connected directly to and supporting the guide wheel for rotation about a transverse axis located a preselected distance below the frame;

a fore-and-aft extending linkage having a rearward end, and a forward end embraced by and pivotally connected to the rearwardly directed flanges for vertical movement of the rearward end relative to the frame behind the wheel support;

a tool support extending downwardly from and movable vertically with the rearward end between an upward tripped position and a lowermost field-working position;

an earthworking tool connected to the tool support for working the soil directly behind the guide wheel; and means for adjusting the lowermost position of the tool support relative to the frame to thereby adjust the working depth of the earthworking tool.

2. The invention as set forth in claim 1 wherein the means for adjusting the lowermost position includes a stop member connected between the tool support and the linkage and limiting downward rocking of the linkage beyond a lowermost adjusted position.

3. In a row crop implement having tools transversely spaced on a frame and adapted to run between rows of crop, rig and guidance structure for following a preexisting groove in the soil and maintaining the tools positioned with respect to the rows, the rig and guidance structure comprising:

a guide wheel adapted to run in the groove;

a wheel support fixed to the frame and supporting the guide wheel for rotation about a transverse axis located a preselected distance below the frame;

a fore-and-aft extending linkage having rearward end, and a forward end pivotally connected to the frame for vertical movement of the rearward end relative to the frame behind the wheel support;

a tool support extending downwardly from and movable vertically with the rearward end between an upward tripped position and a lowermost field-working position;

an earthworking tool connected to the tool support for working the soil directly behind the guide wheel;

means for adjusting the lowermost position of the tool support relative to the frame to thereby adjust the working depth of the earthworking tool;

wherein the means for adjusting the lowermost position includes a stop member connected between the tool support and the linkage and limiting downward rocking of the linkage beyond a lowermost adjusted position; and wherein the linkage comprises a four-bar linkage having upper and lower generally parallel bars, the tool support defining a rear bar and the wheel support defining a front bar of the linkage, and wherein the stop member comprises an adjustable length member extending between one of the parallel bars and the tool support.

4. The invention as set forth in claim 3 including a slotted member receiving a portion of the adjustable length member to thereby permit limited vertical rocking of tool support upwardly from the lowermost adjusted position.

5. The invention as set forth in claim 4 further comprising an adjustable down pressure spring structure connected to the linkage to normally bias the linkage to the lowermost adjusted position while permitting the linkage to rock upwardly against the bias when an obstacle is encountered.

6. In a row crop implement having a tubular frame with an aft face, and tools transversely spaced on the frame and adapted to run between rows of crop, rig and guidance structure for following a preexisting groove in the soil and maintaining the tools in alignment with the rows, the rig and guidance structure comprising:

a guide wheel adapted to run in the groove;

a wheel support fixed to the frame, the wheel support including a flanged member positioned against an aft face of the frame, the flanged member extending downwardly to a lower end supporting the guide wheel for rotation about a transverse axis located a preselected distance directly below the frame;

a fore-and-aft extending linkage having a rearward end, and a forward end pivotally connected to the wheel support for vertical rocking of the rearward end relative to the frame;

a tool support extending downwardly from the rearward end to a lower tool receiving end and movable vertically with the rearward end between an adjustable lowermost field-working position and an upwardly tripped position;

biasing structure yieldingly urging the tool support to the field-working position;

an earthworking tool connected to the tool receiving end; and an adjustable stop connected between the tool support and the linkage for adjusting the lowermost field-working position of the tool support without need for gage wheel structure connected to the linkage.

7. In a row crop implement having tools transversely spaced on a frame and adapted to run between rows of crop, rig and guidance structure for following a preexisting groove in the soil and maintaining the tools in alignment with the rows, the rig and guidance structure comprising:

a guide wheel adapted to run in the groove;

a wheel support fixed to the frame and supporting the guide wheel for rotation about a transverse axis located a preselected distance below the frame;

a fore-and-aft extending linkage having a rearward end, and a forward end pivotally connected to the frame adjacent the wheel support for vertical rocking of the rearward end relative to the frame;

a tool support extending downwardly from the rearward end to a lower tool receiving end and movable vertically with the rearward end between an adjustable lowermost field-working position and an upwardly tripped position;

biasing structure yieldingly urging the tool support to the field-working position;

an earthworking tool connected to the tool receiving end; and an adjustable stop connected between the tool support and the linkage for adjusting the lowermost field-working position of the tool support without need for gage wheel structure connected to the linkage; and wherein the adjustable stop comprises an adjustable length member having a first end slidably received in a slot and limiting downward pivoting of the linkage while permitting the linkage to float upwardly from the field-working position.

8. In a row crop implement having tools transversely spaced on a frame and adapted to run between rows of crop, rig and guidance structure for following a preexisting groove in the soil and maintaining the tools in alignment with the rows, the rig and guidance structure comprising:

a guide wheel adapted to run in the groove;

a wheel support fixed to the frame and supporting the guide wheel for rotation about a transverse axis located a preselected distance below the frame;

a fore-and-aft extending linkage having a rearward end, and a forward end pivotally connected to the frame adjacent the wheel support for vertical rocking of the rearward end relative to the frame;

a tool support extending downwardly from the rearward end to a lower tool receiving end and movable vertically with the rearward end between an adjustable lowermost field-working position and an upwardly tripped position;

biasing structure yieldingly urging the tool support to the field-working position;

an earthworking tool connected to the tool receiving end;

an adjustable stop connected between the tool support and the linkage for adjusting the lowermost field-working position of the tool support without need for gage wheel structure connected to the linkage; and wherein the biasing structure includes adjustable down pressure structure connected between the linkage and the frame, and wherein the adjustable stop and the adjustable down pressure structure include wrench-receiving structure for making the adjustments at closely adjacent locations.

* * * * *